(No Model.)

P. E. MIGNAULT.
CAR COUPLING.

No. 263,421. Patented Aug. 29, 1882.

Attest.
Sidney P. Hollingsworth
Harry Shipley

Inventor.
P. E. Mignault
By his atty
Philip T. Dodge.

UNITED STATES PATENT OFFICE.

PIERRE E. MIGNAULT, OF ACTON VALE, QUEBEC, CANADA.

CAR-COUPLING.

SPECIFICATION forming part of Letters Patent No. 263,421, dated August 29, 1882.

Application filed May 23, 1882. (No model.)

*To all whom it may concern:*

Be it known that I, PIERRE EMILE MIGNAULT, of Acton Vale, in the county of Bagot, Province of Quebec, Canada, have invented certain Improvements in Car-Couplings, of which the following is a specification.

This invention relates to an automatic car-coupling wherein a link is engaged and held by means of a downwardly-swinging hook pivoted within the draw-head; and it consists in certain peculiarities of construction hereinafter described in detail.

Figure 1:
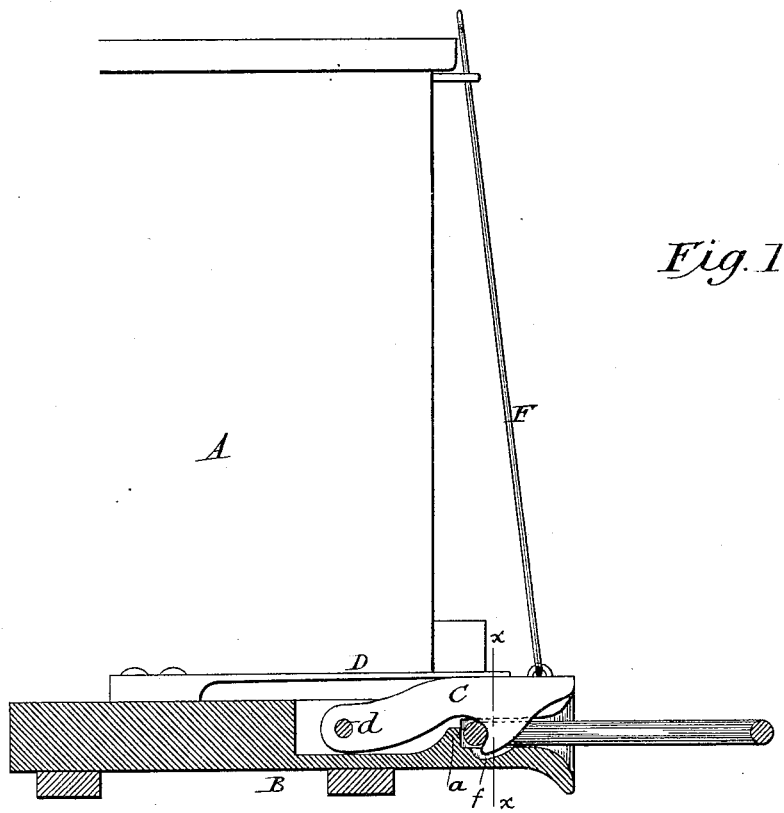
Figure 2:
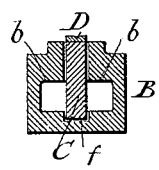
Figure 3:
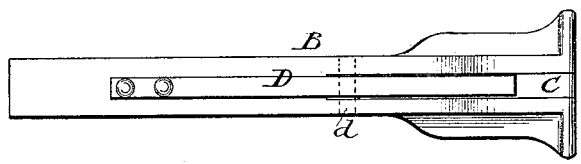

Referring to the accompanying drawings, Figure 1 is a longitudinal vertical section through my draw-head and the device for releasing the link. Fig. 2 is a transverse section of the same on the line *x x*. Fig. 3 is a top plan view.

Referring to the drawings, A represents the body of the car, and B the draw-head. This draw-head consists of a longitudinal bar having its forward end made of flaring form, with a socket of any suitable size therein to admit one end of an ordinary coupling-link. As shown in Fig. 1, the head contains in its interior an elevated shoulder, *a*, designed to limit the entrance of the link and prevent the same from being carried into the head too far. The opening into which the link fits is made of suitable form to retain the same in a horizontal or substantially horizontal position, the upper surface of the socket or opening bearing on top of the link at its inner end, as shown at *b b*.

C represents the coupling-hook seated in a longitudinal slot or mortise in the upper side of the coupling-head. This hook is secured within the head, at its rear end, upon a horizontal pivot, *d*, so that its forward end may swing vertically. The forward end of the hook is beveled on the under side, so that it will be raised by the action of the coupling-link as the latter is forced into the draw-head. The nose or shoulder of the hook has its under side rounded or made concave, as shown in Fig. 1, to enable it to engage the more firmly with the coupling-head and prevent the hook from working upward and being disengaged by the vibratory motion of the link within the head when the car is in motion. The parts are so constructed as to leave between the nose of the hook and the shoulder *a* of the draw-head but little more room than is required to receive the end of the link, in order that the link may be held securely in position and prevented from unnecessary end motion. The nose of the hook retains the link by falling through the same, as represented in Fig. 1, the lower side of the draw-head being recessed, as shown at *f*, to receive the point of the hook when the latter is in its locked position. The shoulder *a*, in addition to limiting the inward motion of the link, serves the additional purpose of preventing the link from being driven backward under the pivoted end of the hook, the effect of which would be to raise the hook and endanger the connection of the cars.

For the purpose of insuring the action of the hook, and as an additional means of preventing its accidental disengagement from the link, I apply to the top of the hook a long flat spring, D, one end of which is secured firmly to the head, while the opposite and forward end is arranged to bear upon the hook, as shown in the drawings.

In order that the hook may be operated from the top of the car, and to avoid the necessity of the attendant passing between the cars, I extend a rod, F, from the hook upward through an eye or guide on the end of the car, the upper end of this rod being made of such form and arranged in such position that it may be readily elevated by an attendant standing on the top of the car.

It will be observed that the mouth of the draw-head and the hook are made in such form that the link engaging therewith will be retained in a horizontal position, in order that it may be certain to enter the draw-head of the next car when the coupling of the two is to be effected.

Having thus described my invention, what I claim is—

The draw-head provided with the internal shoulder to limit the entrance of the link, and with the flaring mouth, terminating in a throat adapted to closely embrace the end of the link and keep the same in a horizontal position, in combination with the hook having its nose arranged to enter the recess in the bottom of the head, and the external spring acting to depress the hook.

PIERRE EMILE MIGNAULT.

Witnesses:
P. G. MORIN,
A. BOURBONNIERE.